United States Patent
Baarsma et al.

(10) Patent No.: US 12,541,618 B2
(45) Date of Patent: Feb. 3, 2026

(54) PRIVACY MANAGER FOR CONNECTED TV AND OVER-THE-TOP APPLICATIONS

(71) Applicant: LiveRamp, Inc., San Francisco, CA (US)

(72) Inventors: Niels Baarsma, Amsterdam (NL); Martijn Eindhoven, Velserbroek (NL)

(73) Assignee: LiveRamp, Inc., San Francisco, CA (US)

( * ) Notice: Subject to any disclaimer, the term of this patent is extended or adjusted under 35 U.S.C. 154(b) by 316 days.

(21) Appl. No.: 18/031,438

(22) PCT Filed: Oct. 13, 2021

(86) PCT No.: PCT/US2021/054680
§ 371 (c)(1),
(2) Date: Apr. 12, 2023

(87) PCT Pub. No.: WO2022/081637
PCT Pub. Date: Apr. 21, 2022

(65) Prior Publication Data
US 2023/0376628 A1  Nov. 23, 2023

Related U.S. Application Data

(60) Provisional application No. 63/092,961, filed on Oct. 16, 2020.

(51) Int. Cl.
*G06F 21/62* (2013.01)
*H04L 9/40* (2022.01)
*G06Q 30/01* (2023.01)

(52) U.S. Cl.
CPC ...... *G06F 21/6245* (2013.01); *G06F 21/6254* (2013.01); *G06F 21/6263* (2013.01); *G06Q 30/01* (2013.01); *H04L 63/20* (2013.01)

(58) Field of Classification Search
CPC ...... G06F 21/60; G06F 21/62; G06F 21/6218; G06F 21/6245; G06F 21/6254; G06F 21/6263; G06Q 30/01; H04L 63/20
See application file for complete search history.

(56) References Cited

U.S. PATENT DOCUMENTS

| | | | |
|---|---|---|---|
| 7,146,329 B2 | 12/2006 | Conkwright et al. | |
| 10,572,684 B2 | 2/2020 | LaFever et al. | |
| 2002/0107433 A1* | 8/2002 | Mault | A61B 5/4872 348/14.05 |
| 2007/0130130 A1* | 6/2007 | Chan | G06F 16/2455 |
| 2011/0022461 A1 | 1/2011 | Simeonov | |
| 2017/0272316 A1* | 9/2017 | Johnson | H04W 12/068 |
| 2019/0379660 A1 | 12/2019 | Thirumavalavan | |
| 2020/0004987 A1* | 1/2020 | Brannon | G06F 16/958 |
| 2020/0210558 A1* | 7/2020 | Barday | G06F 11/3438 |

FOREIGN PATENT DOCUMENTS

WO  0213112 A1  2/2002

OTHER PUBLICATIONS

Partial supplementary European search report for EPO Application No. 21880949.9 (dated Oct. 22, 2024).
Extended European search report for EPO Application No. 21880949.9 (dated Jan. 13, 2025).

* cited by examiner

*Primary Examiner* — D'Arcy Winston Straub

(57) ABSTRACT

A system for processing privacy permissions for consumers utilizing vendor applications allows for recording, storing, and retrieving consent transactions performed by the users (data subjects) in data schemas. The system uses a number of hash-generated IDs, such that when a request is received to retrieve subject data, an organization ID (associated with the vendor or application) and identifying value (associated with the subject) are hashed to create a subject ID. The subject ID, organization ID, and a schema ID for the schema associated with the subject are hashed to create a subject data ID, which is then used to retrieve consent transactions and permissions associated with the subject.

9 Claims, 10 Drawing Sheets

```
{
  "data+fields": {
    {
      "category": {
        "description": "information provided by the individual on their political beliefs, place of birth",
        "id": "cacca27a-c7e4-432d-b411-825be4408c92",
        "name": "Sensitive Personal Information",
        "type": "data-field-category"
      },
      "id": "35113c90-bbfe-4932-8187-d67ea05820a9",
      "name": "Nationally",
      "type": "string"
    },
    {
      "category": {
        "description": "Such as a social security number, driver's license number or passport",
        "id": "753d90ec-4790-44a9-9ce3-d02bc5d80307",
        "name": "Sensitive Personal Identifiers",
        "type": "data-field-category"
      },
      "id": "5c63e400-16d9-466f-9c37-bc03fc0c1aea",
      "name": "Copy of passport",
      "type": "string"
    },
    {
      "category": {
        "description": "Information that is not publicly available personally identifiable information as defined in the Family Educational Rights and Privacy Act (20 U.S.C. section 1232g, 34 C.F.R. Part 99)",
        "id": "25ead93f-db34-4ebe-a04b-8f8cf231acea",
        "name": "Education information",
        "type": "data-field-category"
      },
      "id": "0978b28b-b2fd-4966-bab5-c6cfff4221cf",
      "name": "Class lists",
      "type": "string"
    },
    {
      "category": {
        "description": "including records of personal property, products or services purchased, obtained, or considered, or other purchasing or consuming histories or tendencies.",
        "id": "700b82f1-35f3-4a11-8d03-08a493b7ead9",
        "name": "Commercial information",
```

*FIG. 7*

```
        "type": "data-field-category"
      },
      "id": "8a98fbfd-fe13-47bb-a942-07cd5d876e39",
      "name": "Transactional data (products bought)",
      "type": "string"
    }
  },
  "display_name": "Demo"
  "id": "2a9bb086-7bd6-4bd1-9703-fce55132ce31",
  "legal_base": {
    "description": "The data subject has given permission for the organization to process their personal data for one or more processing activities. Consent must be freely given, clear, and easy to withdraw.",
    "id": "04343b10-4db7-40c8-8567-c99a8fdc28eb",
    "name": "Consent",
    "type": "legal-base"
  },
  "organization_id": "0cab5d2a-19ff04764-82c0-a9bf0aaf1849",
  "purpose": {
    "description": "Keep a record of all consent transactions across multiple devices and provide access to selected parties ensuring they are appraised of the consent state",
    "id": "9b8b68f5-6be6-4741-82ba-ea0204c82f43",
    "name": "Authenticated Cross-Device Consent",
    "type": "purpose"
  }
  "schema_validator": {
    "additionalProperties": false,
    "properties": {
      "Class lists": {
        "type": "string"
      },
      "Copy of passport": {
        "type": "string"
      },
      "identifying_field": {
        "maxLength": 40,
        "minLength": 1,
        "type": "string"
      },
      "Nationality": {
        "type": "string"
```

```
      },
      "timestamp": {
        "maximum": 8638000000000000,
        "minimum": 0,
        "type": "integer"
      },
      "Transactional data (products bought)": {
        "type": "string"
      }
    },
    "required": {
      "identifying_field"
    },
    "type": "object"
  }
}
```

FIG. 7 Continued

| Field | Description | Example |
|---|---|---|
| data | Contains subject data | data": {<br>    "consentString": "XYZ123",<br>    "email":<br>    "han.solo@email.com"<br>}, |
| expiry_date | Time to live. After expiry data, the subject data will be deleted. | 1757927682 |
| id | subject_data_id is a hash of subject_id, organization_id and schema_id | 2d8ed2c8f1140457d8aa1e68 3365b93ca17f53849e780b377 78a0118c35aa892c |
| notification_config | Configuration of the notification on data change webhook. Which data fields to pass in the webhook | {<br>    "consentString"<br>}, |
| notification_url | Destination endpoint for notification webhook | https://destination.com/endpoint |
| organization_id | ID unique to the customer's organization | "add0ee13-312d-4b51-89f0-5 72865cf5a97" |
| schema_id | ID unique to the data schema | "b748ee4e-41aa-4185-86a2- 8073ae019f9" |
| subject_id | Subject_id is a hash of organization_id and identifying field | "cffc5520-8eaa-4679-b714-f8 26e91c2e98" |
| timestamp | Unix timestamp | 1600161282 |

FIG. 9

| Field | Description | Example |
|---|---|---|
| data | Contains subject data | data": {<br>    "consentString": "XYZ123",<br>    "email":<br>    "han.solo@email.com"<br>}, |
| expiry_date | Time to live. After expiry data, the subject data will be deleted. | 1757927682 |
| id | subject_data_id is a hash of subject_id, organization_id and schema_id | 2d8ed2c8f1140457d8aa1e68 3365b93ca17f53849e780b377 78a0118c35aa892c |
| organization_id | ID unique to the customer's organization | "add0ee13-312d-4b51-89f0-5 72865cf5a97" |
| schema_id | ID unique to the data schema | "b748ee4e-41aa-4185-86a2-8073ae019f9" |
| subject_id | Subject_id is a hash of organization_id and identifying field | "cffc5520-8eaa-4679-b714-f8 26e91c2e98" |
| timestamp | Unix timestamp | 1600161282 |

*FIG. 10*

| Field | Description | Example |
|---|---|---|
| id | Unique id assigned to the Integration. This ID is also used as vendor API key | "2dde2f2b-7f1d-47dc-a99b-5 4ad6dcffd3e |
| name | Integration name | "ACME" |
| organization_id | ID unique to the customer's organization | "eea2628d-bfa5-4117-a7d5-5 3e23d5f5f4e" |
| read_access | Read access rights | true |
| schema_id | ID unique to the data schema | "639c602e-c235-4902-838b-5265eee5cf83" |
| subscriptionId | ID unique to the customer's subscription | "30354956" |
| vendor_id | ID unique to vendor which is assigned to the integration | "6a0472e2-73e9-4246-9069-cf1bd42938bb" |
| write_access | Write access rights | true |

*FIG. 11*

PRIVACY MANAGER FOR CONNECTED TV AND OVER-THE-TOP APPLICATIONS

CROSS-REFERENCE TO RELATED APPLICATIONS

This application claims the benefit of U.S. provisional patent application No. 63/092,961, filed on Oct. 16, 2021. Such application is incorporated herein by reference in its entirety.

BACKGROUND

The field of the invention is protection of consumer privacy in compliance with privacy regulations for publishers of connected tv (CTV) and over-the-top (OTT) applications. Under privacy laws and regulations, such as CCPA and GDPR, publishers of CTV and OTT are required to comply with the same informational (notice) and choice (opt-in/opt-out) requirements as web applications and mobile applications. However, the mechanisms used for protection of consumer privacy in mobile and web applications are not functional with CTV and OTT applications.

Regulators around the world are working on more stringent privacy regulations, with CCPA and GDPR in place and many more to come. At the same time, browsers and other software are tearing down the fabric of third-party cookies, which makes managing preferences in all shapes and forms more challenging. Companies have difficulty navigating the patchwork of different regulations and technological changes while trying to provide the best digital services to their end-users with myriad technologies and disconnected data flows. Managing preferences and consent and correct processing of personal data on a consumer level is becoming and will continue to become increasingly difficult in the future.

Due to technical constraints, CTV and OTT services have refrained from utilizing data processing to improve their capabilities and offerings to their partners or have implemented non-compliant consent solutions. For context, the CCPA (California Consumer Privacy Act) and GDPR (General Data Protection Regulation) both require information to be provided to the consumer or data subject before or at the point of collection of the data. In addition, these laws give consumers and data subjects the right to opt-out or consent before data is processed and/or distributed. CTV and OTT applications cannot store information on the device itself (i.e., there are no cookies) so all of the information must be stored server-side based on a DeviceID or UserID connected to the DeviceID. While many technologies have been developed to assist service providers in complying with privacy regulations in the context of web and mobile applications, these types of technologies do not work in CTV and OTT applications. Thus, new technology is needed to provide the consent configuration and generation of opt-out or consent string for CTV and OTT applications in order for such applications to prove compliant with privacy regulations and provide these capabilities to downstream partners.

References mentioned in this background section are not admitted to be prior art with respect to the present invention.

SUMMARY

The present invention is directed to systems and methods for managing consumer privacy (such as in CTV and OTT applications) where the systems and methods allow for recording consent transactions performed by users (which may be referred to as "data subjects") and store all the information necessary to show compliance with privacy regulations dictating collection and use of consumer information in online environments at a provider server or servers. Generally speaking, the consent transactions facilitated by the systems and methods of the present invention result in a series of values saved about the data subjects, which can later be recalled via a dedicated endpoint. These values are determined by fields in the data schema that each consent section has modified and could include the user's preferences (newsletter, profiling, etc.). In this regard, the systems and methods of the present invention serve as a consent and preference management solution operated remotely from the provider servers, particularly suitable for CTV and OTT applications. In certain embodiments, the systems and methods of the present invention provide a central repository for selective curation, logging, and distribution of longitudinal customer preference records across an enterprise's data assets and vendor relationships. With features that focus on application compliance with privacy regulations, these embodiments of the present invention provide consumers with a single easy-to-use preference or trust center user interface for easy collection of preferences. The embodiments further allow for maintaining a single user-level view across data collection points of consumer preferences, integration of data schemes or vendor accounts for persistence of user preferences downstream, and programmatic or manual retrieval of user preferences based on a given identifier in a given schema. Finally, the embodiments also allow for the control of which vendors have access to which particular preference attributes in a particular data section.

Privacy and compliance regulations are changing at a rapid pace and growing in scope and complexity. Consumers have come to expect a high level of transparency and control over their user data, and when companies fail to adequately address consumer privacy, they risk customer abandonment and heavy fines. Certain embodiments of the present invention provide a technological solution to maintaining consumer privacy in CTV and OTT applications, ultimately allowing for the creation and management of versions of different types of user content regarding user data and privacy. The systems and methods of the present invention provide a technological solution useful for seamlessly and compliantly managing customer consent and preferences across systems for all of the data sets associated with an enterprise.

This technological improvement is particularly suitable for such applications because it allows a company to generate and store consent on data subjects based on a deterministic identifier provided by the company. The consent is stored server-side, and can be checked for exactitude, correctness, fidelity, and adequacy, and can be retrieved by the company and its downstream partners to adhere to the data subject indicating consent. The systems and methods of the present invention provide application programming interface (API) endpoints for the application to communicate the consumer or data subject choices, liaise with a server-side API to validate and generate the required consent information, and pull it back into the application.

The systems and methods of the present invention provide a technological solution allowing organizations to manage consent and preferences via server-to-server integrations. This allows for establishing a data subject identity that can integrate with identity providers and store data subject information on, for example in certain embodiments, a hashed IDM ID or email address. Further, these embodiments allow for connecting consent and preferences to the hashed user ID, which can be integrated with identity provider solutions, store consent for multiple types of data categories, and synchronization and updates of preferences across the organization.

These and other features, objects and advantages of the present invention will become better understood from a consideration of the following detailed description of the preferred embodiments in conjunction with the drawings as described following:

DRAWINGS

FIG. 7 shows one example of a schema table according to one embodiment of the systems and methods of the present invention.

FIG. 9 shows one example of a subject data table according to one embodiment of the systems and methods of the present invention.

FIG. 10 shows one example of a transactions database table according to one embodiment of the systems and methods of the present invention.

FIG. 11 shows one example of a schemas-integration table according to one embodiment of the systems and methods of the present invention.

DETAILED DESCRIPTION OF THE PREFERRED EMBODIMENT(S)

Figure 1:
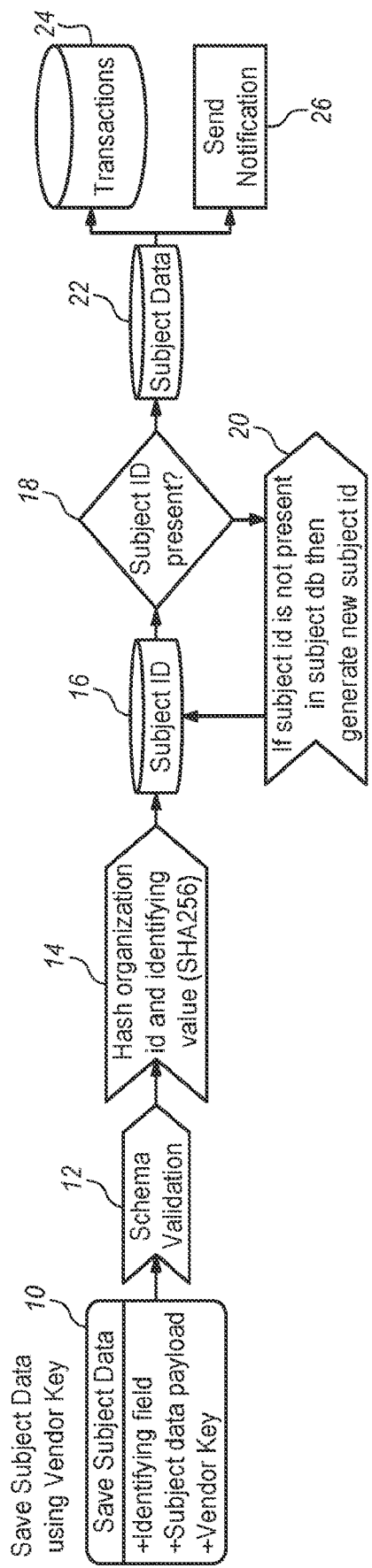
FIG. 1 is a schematic diagram showing one embodiment of a method for saving subject data according to one embodiment of the present invention.

Before the present invention is described in further detail, it should be understood that the invention is not limited to the particular embodiments described in any section of the specification, and that the terms used in describing the particular embodiments are for the purpose of describing those particular embodiments only, and are not intended to be limiting, since the scope of the present invention will be limited only by the claims in a subsequent nonprovisional patent application.

The present invention is directed to systems and methods for managing consumer privacy by a company or service provider (which are referred to herein as "providers" and where the invention may be particularly suitable where the provider provides CTV and OTT applications) where the systems and methods allow for recording consent transactions performed by users (which may be referred to as "data subjects") and store all the information necessary to show compliance with privacy regulations dictating collection and use of consumer information in technological environments, with persistence of user preferences available for providing to the provider's downstream partners (which may be referred to herein as "vendors"). The system and methods of the present invention provide technological solutions utilizing a central repository for the selective curation, logging, and distribution of longitudinal data subject consent and preference records across a provider's data assets and vendor relationships. The technological solution allows for the maintenance of a single customer view across data collection points of consumer preferences, the persistence of user preferences downstream, the programmatic retrieval of user preferences, and the access of control consent and preference status by downstream vendors.

Before providing more specific information about the components and functionality of the technological solutions provided by the systems and methods of the present invention, the entities involved in the technological transactions should be described. As noted above, the systems and methods of the present invention are particularly suitable in the context of consumer and service provider interactions, where the consumer can be referred to as a "data subject" and the service provider as a "provider." Data subjects need a clear way to opt-out or consent to the processing or collection of personal information based on the information provided by the publisher (this may be referred to as a "notice" requirement). Likewise, data subjects in these technological environments must also be able to change specific preference from certain brands or partners before or at the point of data collection. Finally, these data subjects must also be able to adjust their choices and preferences at later points in time. In short, data subjects are the persons of which personal data may be collected, which generally coincides with the user of the provider's platform or application. Personal information that may be collected about data subjects includes, for example, their email address, phone number, customer relationship management identifier (CRM ID), or other similar data. While the data subject is most commonly related to users of the provider, a data subject can also be a device, company, or account.

The providers, on the other hand, need to be able to register different forms of consent and preferences of a data subject on a static/deterministic identifier managed by the provider. The providers also need to be able to access the registered information via authorized access key management, determine which of the data subject information can be accessed by downstream vendors based on consent and preference settings, and respect and comply with opt-out requests that they receive directly from the data subjects. Further, providers need a valid transparency consent string (TC string) to be provided to their partners in order to be able to allow for messaging on the provider platforms.

As noted, at the core of the systems and methods of the present invention are consent transactions, which represent the individual consent events recorded when the data subject gives consent. Each consent transaction contains all of the information necessary to uniquely identify that specific consent transaction as determined by the schema. For example, the consent transaction will include data like the identification of the person who performed the consent transaction, the preference(s) expressed with that consent, the legal notices the data subject has accepted, the proof of consent (e.g., the form the user was presented with), and other similar information related to the consent transaction. Consent transactions can be written and read, but they cannot be modified once they exist. Instead, the consent transactions represent the history of the consents that the data subject has provided, so while new consent transactions can be executed to modify the existing consent preferences of a data subject, the former consent transaction(s) with the original preferences will still be historically available.

As noted above, a data subject represents an entity (person, device, company, account, etc.) about which data is collected and processed by the provider. The data structure affiliated with the data subject is defined by a schema, preferably using a JSON data format. One example of such a data structure for a data subject named "John Doe" is shown below:

```
{
"name": "John Doe",
"title": "Captain",
"uuid": "27e9abf2-8636-4837-87af-988b268e0127"
"identifying_field": "uuid"
}
```

Property names must match data field names from the schema and a data field value must follow the data type defined by the schema. The identifying field is a mandatory field as its value is used to determine a unique subject across the provider organization, as discussed more fully below. All other properties of the data structure may or may not have values, depending on the data field validation (from schema). The identifying field can be any field within the schema and it is up to the sender to define it with the store subject data request. One data subject can correspond to multiple identifying fields. An identifying field can be added after the subject data is created. For example, one subject can have the property "user_id" set as the identifying field with a value of 123, and can also be associated with another identifying field "email" with a value of subject123@email.com. After each identifying field is added, the subject identifying fields can be used interchangeably to read and write subject data for the subject.

One embodiment of the method for saving subject data using a vendor access key is shown in FIG. 1. As shown, the process starts with input of an identifying field, subject data payload, and vendor key at step 10. Schema validation occurs 12 and then the organization ID and identifying value are hashed 14 to determine the subject ID 16 associated with the input data. The system then determines whether the subject ID exists in the subject database 18, and if the subject ID does not exist, a new subject ID 20 is created. Once the subject ID is created (or the subject ID determined matches an existing subject ID), subject data affiliated with the subject ID can be saved 22, and associated with consent transactions for that subject 24 and a notification can be sent 26 according to the subject preferences and consent transactions.

Figure 2:
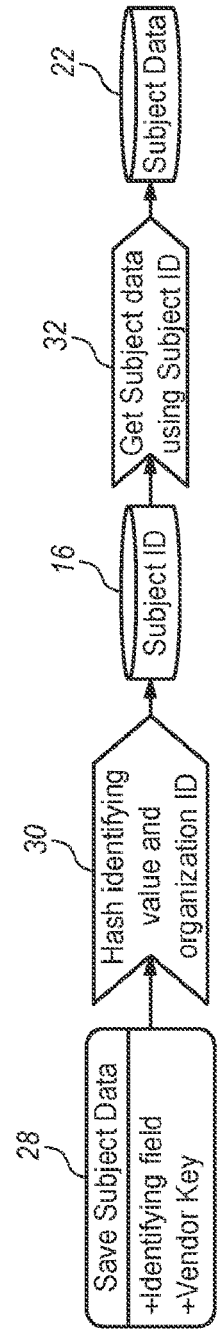
FIG. 2 is a schematic diagram showing one embodiment of a method for retrieving subject data according to one embodiment of the present invention.

One embodiment of the method for retrieving subject data using a vendor access key is provided in FIG. 2. As shown, the process starts with input of an identifying field (having an identifying value) and a vendor key (which is associated with an organization ID) 28. A hash function is applied to the identifying value and organization ID 30 to determine the subject ID 16. Once the subject ID 16 is determined, subject data can be retrieved by matching the subject ID to the subject data associated with that subject ID 32 in the subject ID 16 and subject data 22 databases.

Figure 3:
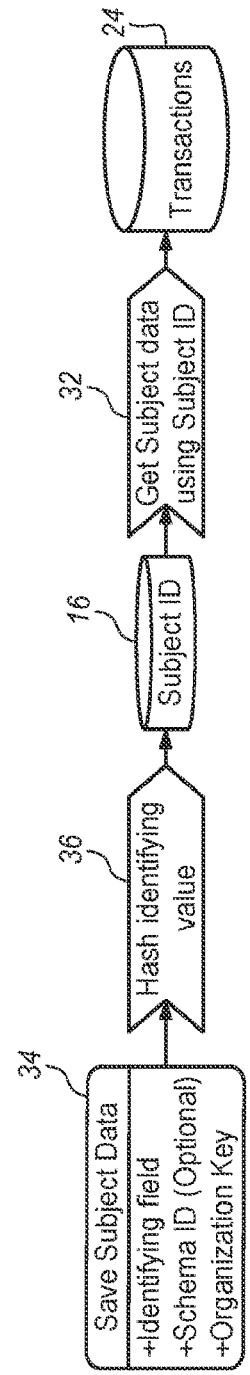
FIG. 3 is a schematic diagram showing one embodiment of a method for retrieving subject data according to another embodiment of the present invention.

Transaction data can also be retrieved from a transactions database, and in one embodiment is done utilizing the process shown in FIG. 3. The process begins with input of an identifying field (having an identifying value) and an organization key 34. In one embodiment, an optional input for schema ID can also be provided. Then the identifying value is hashed 36 to determine the subject ID 16. The subject ID 16 is then used to retrieve data for the associated data subject 32, and transactions 24 associated with the particular data subject can then be retrieved.

Figure 5:
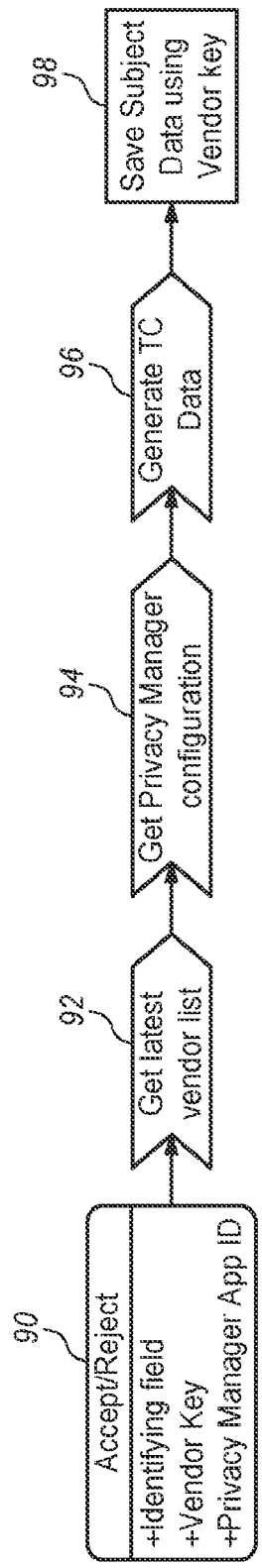
FIG. 5 is a schematic diagram showing one embodiment of the architecture of saving subject data using a vendor key according to one embodiment of the present invention.

FIG. 5 shows the process for applying a save/reject function on a subject with input as identifying field, vendor key, and privacy manager application ID 90. The latest vendor list is retrieved 92 and the privacy manager configuration is retrieved 94. From these data the transaction consent string (TC string) or data 96 can be created, and subject data saved using the vendor key 98.

Access to the data associated with an organization is determined by a console access management system. In one embodiment, a single administrator permission is manually assigned to a given console user. Any console user that has administrator permissions is able to administer the access keys for the organization. The access keys are the ways in which requests sent to the system are authorized, and authorization determines if the client can access the system resources. Depending on the action that is performed, one of two types of authorization keys must be provided. First, an application programming interface (API) authorization is implemented as hypertext transfer protocol (HTTP) basic authentication over transport layer security (TLS) (HTTP secure or HTTPS). API keys can be obtained from the console user interface (UI), and connection to the API can be established using TLS 1.2 (or better). One of the most common calls clients will make via the API is to post or get subject data. A simple way to authenticate is to use the organization API key or vendor API key, as dictated by the situation. A vendor API key may be used, for example, for storing and retrieving subject data, while an organization API key may be used for managing organization resources.

In the preferred embodiment of the systems and methods of the present invention for storing and reading subject data, a vendor key 130 must be provided. A console user with administrator permissions can generate a vendor key 130 within integration and then use it in the header when sending a request. It is important to note that every writing and reading operation affects the computational costs. Organization API keys, on the other hand, are keys used by the organization to access and manage organization data and resources outside the console application. They can be used to create and list schema, manage data fields, add and modify integrations, retrieve subject or transaction data, etc. However, they do not grant permissions to create and save subject data or to create new organization keys. Organization keys are created through the console application, and there is no limit on the number of organization keys that can be created. Organization keys do not expire and are valid and can be used until they are deleted.

Figure 6:
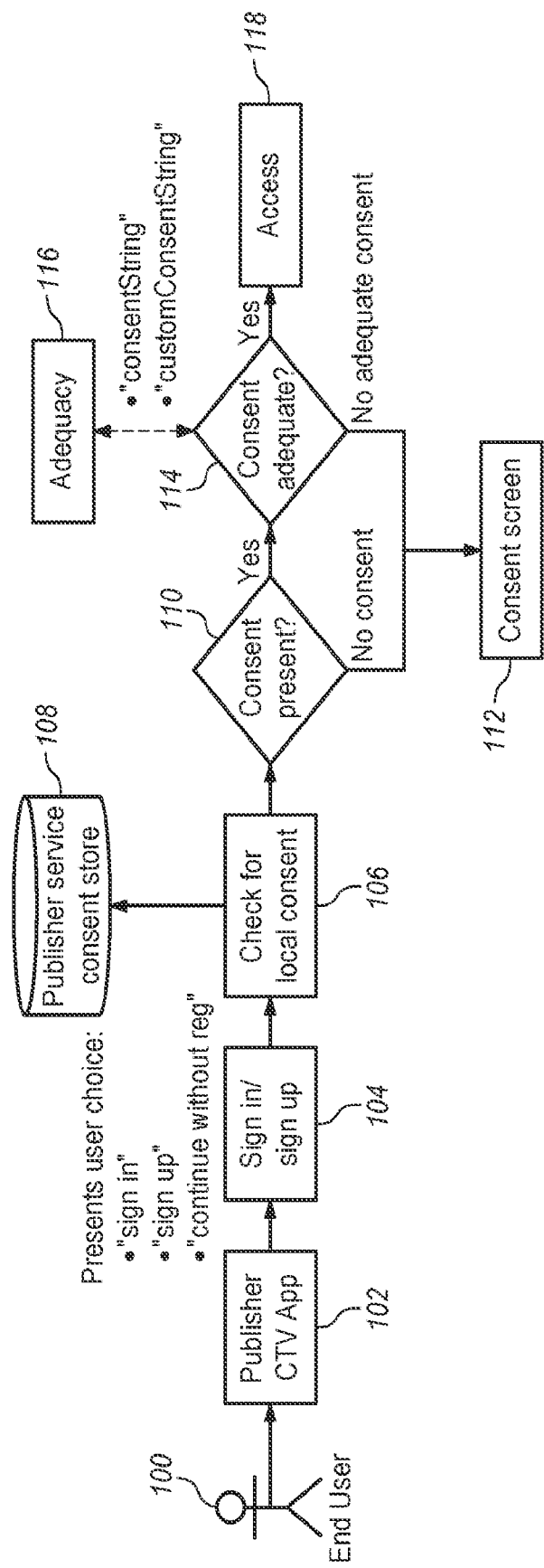
FIG. 6 is a schematic diagram showing one method for integrating the systems and methods of the present invention into a CTV application according to one embodiment of the present invention.

With reference to FIG. 6, consent and access for an end user 100 is illustrated. In this example, the system is a CTV system. Publisher CTV app 102 is accessed by end user 102, which presents a sign-in or sign-up interface 104. The option for continuing without registering may also be provided. The system checks for local consent 106 using the data from publisher service consent store 108. At decision block 110 for consent present, if the result is no, then processing goes to the consent screen 112 indicating that consent was not provided. If consent is provided, then at decision block 114 it is determined if the consent is adequate as measured by the system. Adequacy may be tested using an adequacy adaptor 116 applying a method described below with the consent string. If consent is not adequate, then processing returns to consent screen 112 to indicate that consent was not adequate. If consent is found to be adequate, then CTV access is provided 118.

Figure 4:
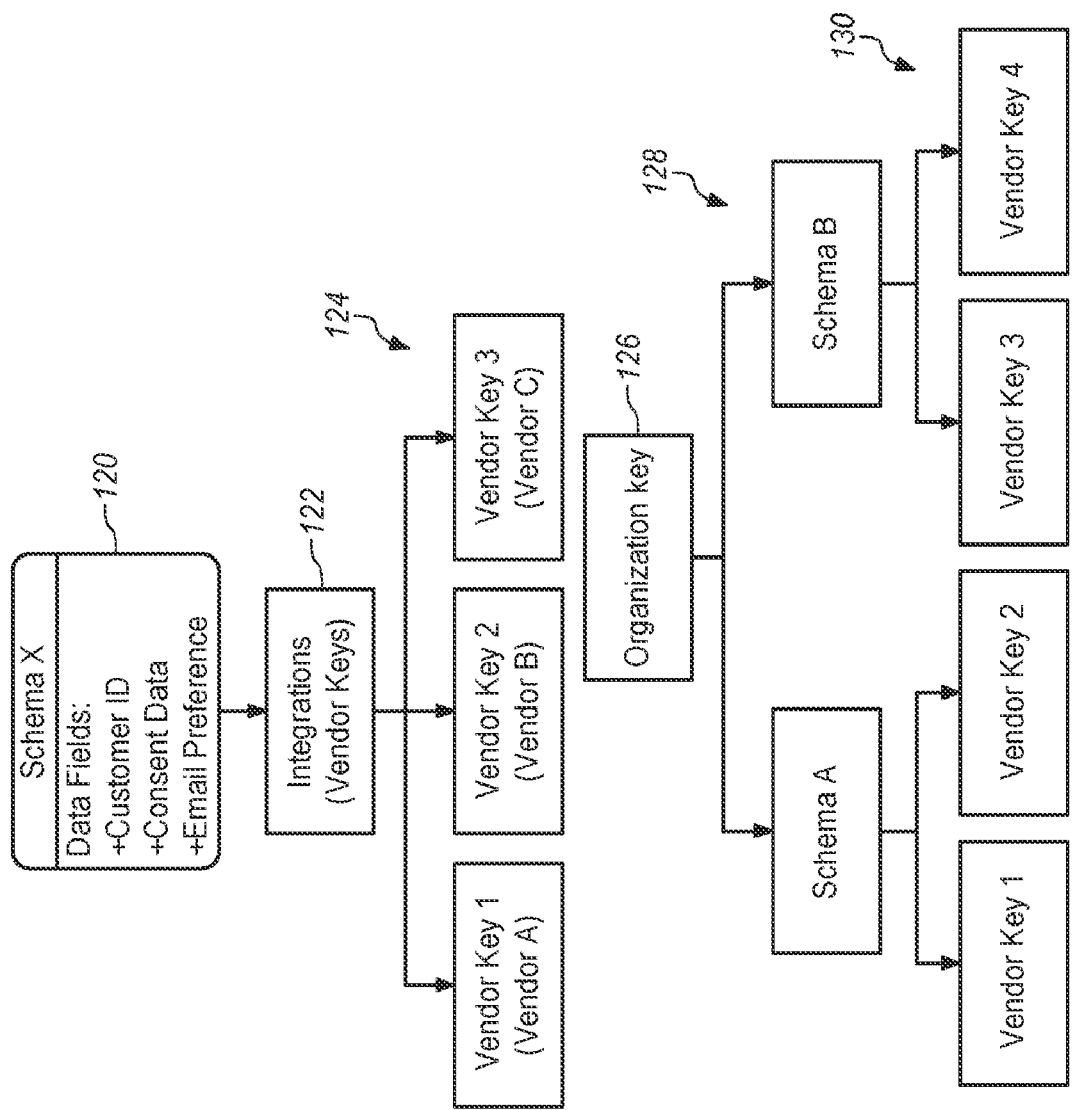
FIG. 4 is a schematic diagram showing one embodiment of the schema structure and architecture according to one embodiment of the present invention.

For the systems and methods of the present invention, data is structured using data schemas as shown in FIG. 4. A data schema is defined via API or user interface and has the following properties: (a) name—the name of the schema, (b) purpose—used to log the purpose for which the transaction data is processed, (c) legal basis—used to log the legal basis under which the transaction data is processed, and (d) data fields—used for structure and data validation. A data schema template may be utilized to pre-configure data schemas for particular purposes and applications. The template may include, for example, the purpose, legal basis, and data fields for the data schema.

The data fields are used to structure and validate data and should be predetermined via API or user interface. A data field has the following properties: (a) name—the name of the data field, (b) type—the type of data being stored in the data field, (c) description—description of data being stored in the data field, (d) category—the data category of the data stored in the data field, and (e) validator—used to validate the data stored in the data field. A public data field is a data field that is preconfigured and already has a data category, type, and validator. The systems and methods of the present invention utilize a schema database for containing the data schemas and data fields (including public data fields).

A schema table and a subject table are connected to the schema API. An example schema table 38 is shown in FIG. 9. A schemas database (such as a NoSQL database) contains data schemas, data fields, and public data fields. A subject table contains mapping from a subject ID to a subject data ID. In situations where a fast response time is required (such as in the get-subject-data requests, described more fully below), a function for organization will query a caching layer or cluster, but if the query is not cached than a database (such as a non-relational or NoSQL database) will be queried. The subject ID is a hash of the organization ID and identifying field, while the subject data ID is a hash of the subject ID, organization ID, and schema ID.

Figure 8:
FIG. 8 shows one example of a subject table according to one embodiment of the systems and methods of the present invention.

An example subject table 40 is shown in FIG. 8. A subject data table contains the last known state of subject data. A caching layer is in place in front of the subject table to optimize performance since a high response rate is required for this data. An example subject data table 42 is shown in FIG. 11. Fields included in the subject data table may include, for example, (a) a data field, which contains the subject data, (b) an expiry date, which denotes the expiration date after which the subject data will be deleted, (c) an id field, which provides the subject data ID (a hash of the subject ID, organization ID, and schema ID), (d) a notification configuration field, which is a configuration of the notification on data change webhook, identifying which data fields to pass in the webhook, (e) a notification URL field, which identifies the destination endpoint for notification webhook, (f) an organization ID field, which is a unique ID for the customer's organization, (g) a schema ID field, which is a unique ID for the data schema, (h) a subject ID field, which is a hash of the organization ID and identifying field, and (i) a timestamp field, which is a timestamp.

As noted above, transactions are stored in a transactions database 24 such that the historical transactions can be retrieved. The transactions database may include data tables having the following fields: (a) a data field, which contains the subject data, (b) an expiry date field, which denotes the expiration data after which the subject data will be deleted, (c) an ID field, which identifies the subject data ID (a hash of the subject ID, organization ID, and schema ID), (d) an organization ID field, which is a unique ID for the customer's organization, (e) a schema ID field, which is a unique ID for the data schema, (f) a subject ID field, which is a hash of the organization ID and identifying field, and (g) a timestamp field, which is a timestamp. An example transactions database table 44 is shown in FIG. 10.

An integrations table 122 (FIG. 4) is utilized to store the access keys and access rights, per vendor per schema. The integrations table 122 may include, among other items, the following fields: (a) an ID field, which is a unique ID assigned to the integration, and which is also used as a vendor API key, (b) a name field, which is the integration name, (c) an organization ID field 126, which is a unique ID for the customer's organization, (d) a read access field, which provides the read access rights, (e) a schema ID field 128, which is a unique ID for the data schema, (f) a subscription ID field, which is an ID unique to the customer's subscription, (g) a vendor ID field 124, which is an ID unique to the vendor which is assigned to the integration, and (h) a write access field, which provides the write access rights. An example integrations table 46 is shown in FIG. 7. Each schema is associated potentially with multiple vendor keys 130. Functions that may be called upon within the API include organization functions that help manage data fields, public data fields, data schemas, schema templates, etc. Other functions can be used to create schema using predefined values from schema template, obtain all schema properties for a given schema, etc. An integrations API contains organization key management and key management per schema. Each schema-integration represents an API key (vendor key), and the customer can control the access rights per key. A notification webhook can be configured for each integration. A consent transaction is submitted directly, via the API, in batch, or via an adapter. The call to the system contains an API key and an identifying field, allowing the schema to be validated and transactions to be managed. Functions operating within the integrations API include those for managing organization keys (which are used to manage data across schemas and should not be shared outside the organization), managing vendors (vendors have an ID, name, and description, and are assigned by integration level to keep track of which vendor has access rights to a schema), managing integrations (schema-integrations represent the access to a schema for a given vendor), and managing schema integration keys.

A subject data API includes functions that are operable to (a) execute the generation of a subject ID by hashing the identifying field, (b) store the subject ID in the subject table and the subject data ID in the subject data table, etc., (c) execute the process of getting subject data, (d) delete subject data from the subject data table and transactions table, (e) add an additional identifying field that is mapped to the subject ID, (f) send billing event to message cue, (g) get all historical transactions data from the transactions table, and (g) process API keys and return access policy messages. Finally, API functions called through end points of the infrastructure include those for picking up subject data and storing it in the transactions database and those for sending billing events.

As a general matter, the foregoing may be described with reference to specific hardware components and systems. In the preferred embodiment, the system and methods of the present invention are based in the cloud and rely on managed services (such as AWS managed services provided by Amazon). The following services may be utilized in the core infrastructure: a NoSQL database, a caching layer for the NoSQL database, a relational database, a message queue, an API, serverless compute services, authentication, authorization, user management services, and event-based billing system services.

Figure 12:
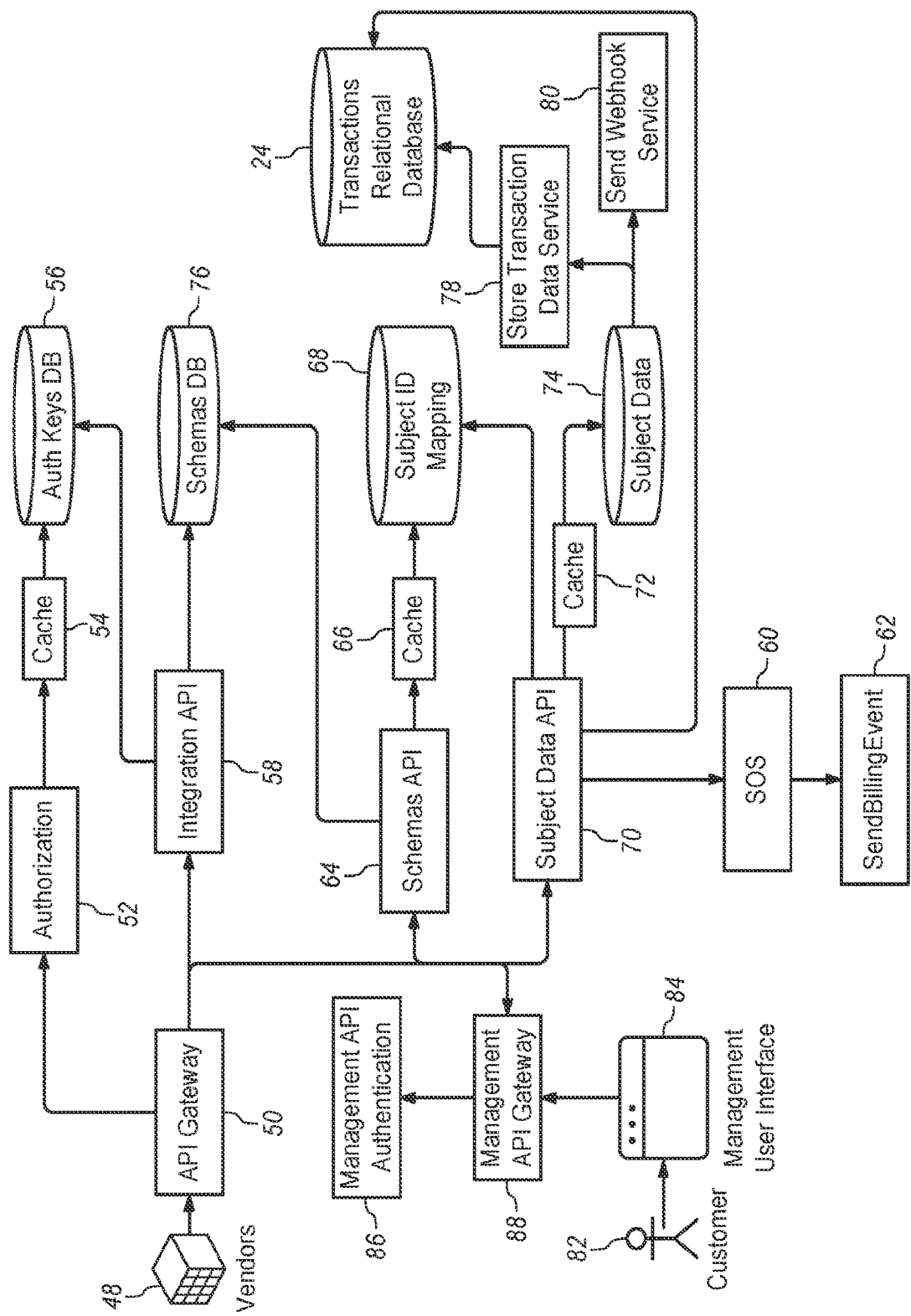
FIG. 12 shows one embodiment of the system of the present invention.

Having described the various components of the system of the present invention, one embodiment of the method of use of the present invention for creating a subject can be described with reference to FIG. 12. As shown, the process begins with the receipt of a request from a vendor 48 at the vendor API gateway 50, which invokes the authorizer function 52. A request for creating a subject can take the following form in one example:

```
POST https://api.dev.preferencelink.com/data-api/subjects
apiKey: e328fd00-5553-4715-aff8-e8590b34336
PL-Retention-Days:14
{
"identifying_field": "email"
"email": "subject1@email.com"
"phone": "223-343"
}
```

The authorizer function 52 gets an API value key from the event header (the "apiKey"), and if the API key value is null or undefined, a deny policy message is returned. A query is executed on the authorization caching layer 54 that searches for the API key in the schema-integration table. If not cached, a query is executed on a NoSQL database authorization key database 56. If the API key is not found, a deny policy message is returned. Otherwise, the system matches the request type and integration from the query result with permissions. If the request doesn't have permission, a deny policy message is returned. A context object is created using integration properties organization ID, integration ID, subscription ID, schema ID, notification configuration, and notification URL. An allow policy message is returned with the context object.

At this point, the vendor API gateway 50 invokes a create-subject function object (containing properties from previous authorizer context objects). The system checks if the event object contains an organization ID, and if not, returns an error message. Then the system checks if the event object contains a subscription ID, and if not, returns an error message. A message is then sent to a messaging cue 60 to be processed by a send-billing-event function 62. The system also checks if the request body contains a valid JSON, and if not, returns an error message. The schema ID is then retrieved from the event context object at schema API 64. Using the schema ID and organization ID, the schema is retrieved from the schema table. If the schema is not found, an error message results. Then the request body is checked for an identifying field property, and if it does not contain one, a random unique identifier (UUID) is generated. The request body is then validated against the schema definition, and if it is not valid, an error message is returned. If valid, a subject ID is created by hashing the identifying value and organization ID and applied through the schemas caching layer 66 to subject ID mapping database 68. The subject ID can then be used to retrieve the subject from the subject table through subject data API 70, subject caching layer 72, and subject database 74. If no subject is found, the subject is saved as a new subject in subject database 74. An expiration date can then be calculated and the subject ID, organization ID, and schema ID are hashed to get a unique subject data ID for the subject ID mapping database 68. The subject data is saved, and any existing subject data is overwritten. If the create subject function reaches this point, it is deemed successful, and a success status response is returned along with the subject data. Otherwise, an error response is returned.

A similar process can be used for retrieving subject data, using a get-subject-data function. The API gateway 50 receives the request and invokes the authorizer function 52 passing event object. An example request message for getting subject data can take the following form:

```
GET https://api.preferencelink.com/data-api/subjects/identifying-
values/test-subject@email.com
apiKey: e6a8f345-2253-4796-a9f8-e85490b34816
```

The integrations API 58 gets the API key value from the event header and if the value is null or undefined returns a deny policy message. If the API key retrieval is successful, a query is executed to search for the API key in the schema-integration table at schemas database 76. If an API key is not found in the schema-integration table, a deny policy message is returned. Otherwise, the system matches the request type and integration (from query result) permissions. If there is no permission for the request, a deny policy message is returned. Otherwise, the system creates a context object using integration properties: organization ID, integration ID, subscription ID, schema ID, notification configuration, and notification URL. An allow policy message is returned with the context object to the API gateway 50.

At this point, the vendor API gateway 50 invokes the get-subject-data function passing event object (containing properties from the previous authorizer context object). The get subject data function checks if the event object contains an organization ID, and if not, returns an error message. If it does, then the system checks if it contains a subscription ID (from, for example, the billing system), and if not, returns an error message. If it does, a message is sent via messaging queue 60 to be processed by a send-billing-event function 62. Next, the identifying value is retrieved from the header, and the validation for this is set on API gateway 50, so it cannot be null. A hash function is applied to the identifying value and organization ID to get a subject ID. A get-item operation is executed on the subject table to get the subject using the subject ID. If no subject is found in the subject table, a message is returned indicating that the subject does not exist. If a subject is found, a schema ID is retrieved from the event context object, and a hash is applied to the subject ID, organization ID, and schema ID to create a unique subject data ID. The system then executes the get subject data get operation on the NoSQL database using the subject data ID. If the subject data does not exist, a message is returned indicating that the subject data has not been found. Otherwise, a subject data DTO (data transfer out) object is created, a success message is returned, and subject data is transferred out.

Now, based off an identifying field known about a subject (such as the subject's email, phone number, etc.), consent and permissions records can be created for the subject corresponding with those identifying fields, and such records can be accessed (or overwritten) at a later date to determine whether the subject affiliated with some identifying field has given permissions to a particular organization or vendor. In this regard, as a user logs into an organization or vendor application (such as a CTV application), and provides some identifying fields, so the system can retrieve permissions records and consent transactions affiliated with the subject to determine permissions and allowances.

The system allows for storage of data to transactions database 24 through store transaction data service 78 and webhooks may be sent through send webhook service 80. This allows for real-time status and updates to exit the system. Customer 82 access to the system is provided through management UI 84. As previously described, this UI allows access to the system through two APIs, the management API authentication 86 and management API gateway 88.

In the implementations described herein and in various alternative implementations, the present invention may be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The invention claimed is:

1. A method for managing privacy for a subject accessing an application on a consent-activated device without the capability of storing local data, the method comprising the steps of:
   receiving at a provider server a request message through a vendor application programming interface (API) gateway for determining permissions for a subject using the consent-activated device, wherein the request message comprises an organization ID and at least one identifying value associated with the subject;
   hashing the organization ID and the identifying value to create a subject ID;
   based on values stored in a subject table associating a number of subjects each with a subject ID, determine the corresponding subject for the created subject ID;
   for the subject affiliated with the subject ID, identifying one or more data schemas corresponding to the subject, wherein the data schemas comprise a schema ID;
   hashing the subject ID, organization ID, and schema ID to create a subject data ID;
   retrieving from an authorized API keys database one or more consent records associated with the subject data ID, wherein the one or more consent records comprises permissions for the subject; and
   provide access at the consent-activated device based on the permissions in the one or more consent records.

2. The method of claim 1, wherein the consent-activated device is a connected tv (CTV) device.

3. The method of claim 1, wherein the consent-activated device is an over-the-top (OTT) device.

4. A system for determining permissions allowances for a subject accessing an application, the system comprising:
   a consent-activated device;
   a subject table stored in a subject database;
   a schema table stored in a schema database;
   an authorized application programming interface (API) keys database;
   a provider server in communication with the transactions database, the subject database, the schema database, and the consent-activated device, wherein the provider server comprises a vendor API gateway, a processor, and a memory, the memory containing instructions that, when executed by the processor, cause the processor to:
   receive a request message through the vendor API gateway, the request message comprising an organization ID and at least one identifying value associated with the subject;
   hash the organization ID and the identifying value to create a subject ID;
   based on values stored in the subject table associating a number of subjects each with a subject ID, determine the corresponding subject for the created subject ID;
   for the subject affiliated with the subject ID, identify one or more data schemas corresponding to the subject in the schema table, wherein the data schemas comprise a schema ID;
   hash the subject ID, organization ID, and schema ID to create a subject data ID;
   retrieve from the authorized API keys database one or more consent records associated with the subject data ID, wherein the one or more consent records comprises permissions for the subject; and
   provide access at the consent-activated device based on the permissions in the one or more consent records in the authorized API keys database.

5. The system of claim 4, wherein the consent-activated device is a connected television (CTV) device.

6. The system of claim 4, wherein the consent-activated device is an over-the-top (OTT) device.

7. The system of claim 4, further comprising a management user interface (UI) providing customer access to the provider server.

8. The system of claim 7, further comprising a management API in communication between the management UI and the provider server.

9. The system of claim 8, further comprising a management API authentication between the management UI and the provider server.

* * * * *